(12) United States Patent
Benakli et al.

(10) Patent No.: US 8,830,631 B2
(45) Date of Patent: *Sep. 9, 2014

(54) FEATURES FOR WRITE FRINGING REDUCTION

(71) Applicant: Seagate Technology LLC, Cupertino, CA (US)

(72) Inventors: Mourad Benakli, Eden Prairie, MN (US); Michael Mallary, Sterling, MA (US)

(73) Assignee: Seagate Technology LLC, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/914,990

(22) Filed: Jun. 11, 2013

(65) Prior Publication Data

US 2013/0271873 A1 Oct. 17, 2013

Related U.S. Application Data

(63) Continuation of application No. 13/585,625, filed on Aug. 14, 2012, now Pat. No. 8,462,463, which is a continuation of application No. 12/967,927, filed on Dec. 14, 2010, now Pat. No. 8,243,389, which is a continuation of application No. 11/592,507, filed on Nov. 3, 2006, now Pat. No. 7,876,529.

(60) Provisional application No. 60/733,247, filed on Nov. 3, 2005.

(51) Int. Cl.
*G11B 5/667* (2006.01)
*G11B 5/82* (2006.01)
*G11B 5/855* (2006.01)

(52) U.S. Cl.
CPC ............. *G11B 5/667* (2013.01); *G11B 5/855* (2013.01); *G11B 5/82* (2013.01)
USPC ........................................................ 360/135

(58) Field of Classification Search
CPC .......... G11B 5/82; G11B 5/855; G11B 5/667
USPC ............................... 360/135; 428/826–848.9
See application file for complete search history.

(56) References Cited

U.S. PATENT DOCUMENTS

RE33,949 E    6/1992   Mallary et al.
5,568,331 A   10/1996  Akagi et al.
(Continued)

OTHER PUBLICATIONS

File History for U.S. Appl. No. 11/592,507.

(Continued)

*Primary Examiner* — Craig A. Renner
(74) *Attorney, Agent, or Firm* — Hollingsworth Davis, LLC

(57) ABSTRACT

A recording media design having discrete track recording structure where the trenches between tracks are filled with a soft magnetic material is provided. The soft magnetic material provides a low magnetic impedance path to the soft underlayer such that fringe fields from the write head are conducted to the soft underlayer without having a negative effect such as adjacent track erasure. A method of manufacturing the media includes a nano-imprint step and ion milling out the data layer to create the trenches. A $B_2O_3$ material allows the data layer to be ion milled out without redeposition bridging the $B_2O_3$ layer thus preventing lift off of the mask. The trenches are then filled by ion deposition with the layers of ferromagnetic material separated by an anti-ferromagnetic coupling that causes the flux to be conducted to the soft underlayer and remnant flux to rotate within the island and not into adjacent tracks.

20 Claims, 10 Drawing Sheets

(56) References Cited

U.S. PATENT DOCUMENTS

| | | |
|---|---|---|
| 5,956,216 A | 9/1999 | Chou |
| 6,014,296 A | 1/2000 | Ichihara et al. |
| 6,391,430 B1 * | 5/2002 | Fullerton et al. ............... 428/828 |
| 6,576,113 B1 | 6/2003 | Scherer et al. |
| 6,643,082 B1 | 11/2003 | Belser |
| 6,660,357 B1 | 12/2003 | Litvinov et al. |
| 6,723,450 B2 * | 4/2004 | Do et al. ....................... 428/828 |
| 6,738,207 B1 | 5/2004 | Belser et al. |
| 6,770,386 B1 * | 8/2004 | Hara et al. .................... 428/831 |
| 6,773,834 B2 * | 8/2004 | Do et al. ....................... 428/828 |
| 6,842,313 B1 | 1/2005 | Mallary |
| 6,890,667 B1 | 5/2005 | Lairson et al. |
| 6,947,235 B2 | 9/2005 | Albrecht et al. |
| 7,876,529 B1 | 1/2011 | Benakli et al. |
| 8,243,389 B2 | 8/2012 | Benakli et al. |
| 8,462,463 B2 | 6/2013 | Benakli et al. |
| 2002/0034666 A1 | 3/2002 | Kiely |
| 2002/0136927 A1 | 9/2002 | Hieda et al. |
| 2002/0142192 A1 | 10/2002 | Kamata et al. |
| 2003/0179481 A1 | 9/2003 | McNeil et al. |
| 2003/0234470 A1 | 12/2003 | Haan et al. |
| 2004/0101713 A1 | 5/2004 | Wachenschwanz et al. |
| 2004/0131890 A1 | 7/2004 | Kikitsu et al. |
| 2004/0166372 A1 | 8/2004 | Haginoya et al. |
| 2004/0174636 A1 | 9/2004 | Suzuki et al. |
| 2004/0191557 A1 | 9/2004 | Kamata et al. |
| 2004/0258833 A1 | 12/2004 | Kamata et al. |
| 2005/0036223 A1 | 2/2005 | Wachenschwanz et al. |
| 2005/0122609 A1 | 6/2005 | Albrecht et al. |
| 2005/0122612 A1 | 6/2005 | Albrecht et al. |
| 2005/0134992 A1 | 6/2005 | Homola et al. |
| 2005/0146992 A1 * | 7/2005 | Inomata et al. ............ 369/13.02 |
| 2005/0157597 A1 | 7/2005 | Sendur et al. |
| 2005/0190478 A1 | 9/2005 | Hsiao et al. |
| 2006/0139799 A1 | 6/2006 | Wu et al. |
| 2006/0228586 A1 * | 10/2006 | Girt et al. ...................... 428/828 |
| 2006/0269792 A1 * | 11/2006 | Fullerton et al. .............. 428/828 |
| 2006/0269799 A1 * | 11/2006 | Do et al. .................... 428/836.2 |
| 2007/0020486 A1 * | 1/2007 | Berger et al. ............... 428/828.1 |
| 2007/0037016 A1 * | 2/2007 | Do et al. ....................... 428/828 |

OTHER PUBLICATIONS

File History for U.S. Appl. No. 12/967,927.
File History for U.S. Appl. No. 13/585,625.
"What is DTR?", Komag, Inc., http://www.komag.com/technology/dtr_what.html, copyright Komag Inc., Nov. 30, 2005, p. 1.

\* cited by examiner

PRIOR ART
ACTUAL DTR/PMR MEDIA DESIGN

FEATURES FOR WRITE FRINGING REDUCTION

CROSS REFERENCE TO RELATED APPLICATIONS

This application is a continuation of U.S. patent application Ser. No. 13/585,625 filed on Aug. 14, 2012, now U.S. Pat. No. 8,462,463, which is a continuation of U.S. patent application Ser. No. 12/967,927, filed Dec. 14, 2010, now U.S. Pat. No. 8,243,389, which is a continuation of U.S. patent application Ser. No. 11/592,507 filed on Nov. 3, 2006, now U.S. Pat. No. 7,876,529, which claims the benefit of U.S. Provisional Patent Application Ser. No. 60/733,247, filed Nov. 3, 2005, which are incorporated herein by reference in their entireties.

BACKGROUND

1. Field of the Invention

The present invention is related to magnetic recording systems, and in particular, to write fringing reduction in discrete track recording.

2. Background Information

Recently, the trend in magnetic recording is to employ perpendicular magnetic recording (PMR) techniques. In perpendicular magnetic recording, the magnetic domains are aligned perpendicularly to the surface of the disk platter. This allows bits to be placed closer together on the platter, thus increasing storage density to an amount greater than that which has been achieved in conventional longitudinal recording.

A further way to increase bit density is to employ discrete track recording (DTR). In discrete track recording, magnetic information is stored on single tracks in the media as opposed to storing the information in a bit patterned media. In a DTR system, adjacent tracks are physically separated by air gaps in the form of grooves. These air gaps are minimized to increase the bit density such that tracks are placed closer together for a high track per inch (TPI) configuration allowing a high bits per square inch count in the media. However, this results in a low magnetic write width (MWW), which can in turn result in write field loss, and thus loss of an overwrite (OVW) from the head. Preferably, the magnetic write width of the head should be as close to the width of the track as possible, however, there still exists a tendency to have some of the field extend outwardly from the head and reach into the adjacent track. Such a field is known as a fringe field. The fringing magnetic flux can travel into the adjacent track leading to adjacent track erasure.

Furthermore, in a standard head media design, the head field in the off-track direction is found to decay slowly. This slow decay is disadvantageous because it adds to further adjacent track erasure as the fringe field decays. It has been challenging to address this problem because the size of the write head, the amount of the fringe field, the fly height of the head, and the interlayer thicknesses in the media are parameters that are involved in the phenomenon, however, such parameters are essentially set and cannot be readily changed. For example, it is unlikely that the head (and therefore the MWW) could be narrowed readily, without the loss of OVW.

To address the write fringing issue, prior techniques have provided floating side shields in the write head. For example, U.S. Pat. No. RE 33,949 of Mallary, et al., which issued on Jun. 2, 1992, for a VERTICAL MAGNETIC RECORDING ARRANGEMENT, provides a write head for perpendicular recording that includes a shield on the write pole tip that decreases the fringing field thus improving signal to noise ratio in the recording process. However, the side shield on the pole tip can reduce the field strength of the write field, which is undesirable. Moreover, it is also not desirable to require an additional component to be added to the write pole.

Therefore, there remains a need for a technique for reducing write fringe fields that does not require placing a side shield on the write head, which side shield may result in reduced field strength, and necessitates modifications to head components. There remains a further need for such a technique that is suitable for use in a DTR environment.

SUMMARY OF THE INVENTION

These and other disadvantages of prior techniques are overcome by the present invention, which is an improved DTR media design for a high track per inch system. The DTR media of the present invention includes ferromagnetic islands that are disposed in the air gap grooves between tracks. The ferromagnetic islands act to conduct the write fringing magnetic flux into the soft underlayer of the media to thereby reduce the risk of adjacent track erasure.

More specifically, in a first embodiment of the invention, a ferromagnetic island is located within each groove between tracks in the media. The island is flush or slightly recessed from the top recording layer of a magnetic recording disk. The bottom of the islands are located adjacent to the bottom of the recording layer. The magnetic properties of the ferromagnetic islands are selected to conduct the fringe field flux directly downwardly into the soft underlayer of the media. This technique minimizes the loss of on-track write field and minimizes the strength of erase field in adjacent tracks.

A method of manufacturing the DTR media is also provided in accordance with the present invention. Briefly, a special layered mask is used to create trenches between tracks in the media data layer. Ion milling techniques are used to remove remaining data layer material. Ion beam deposition (IBD) steps are used to place the layers forming the ferromagnetic islands within the trenches, as described further herein.

BRIEF DESCRIPTION OF THE DRAWINGS

The above and further advantages of the invention may be better understood with reference to the accompanying drawings, in which like reference characters represent the same components.

DETAILED DESCRIPTION

Figure 1:
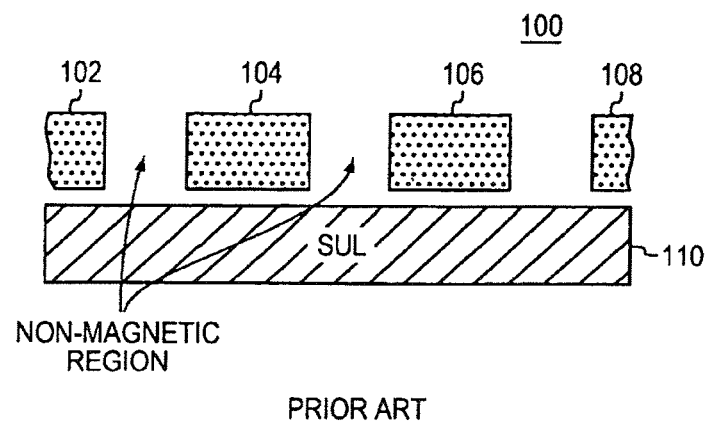
FIG. 1 is a schematic illustration of a typical DTR/PMR media design in accordance with the prior art.

FIG. 1 illustrates a cross section of a prior art DTR disk media 100. The disk media 100 contains discrete tracks 102 through 108 which comprise the recording layer of the disk media. The discrete tracks 102 through 108 are the data layer in which the information is stored on the disk, i.e. these tracks contain the domains that are magnetically adjusted when writing data onto the disk and which are analyzed to read information from the disk. A soft underlayer 110 may be comprised of an alloy of cobalt/tantalum/zirconium (CoTaZr) and Ruthenium (Ru). The soft underlayer 110 provides a magnetic return path for the flux during read and write operations involving the perpendicular recording disk media 100.

Figure 2:
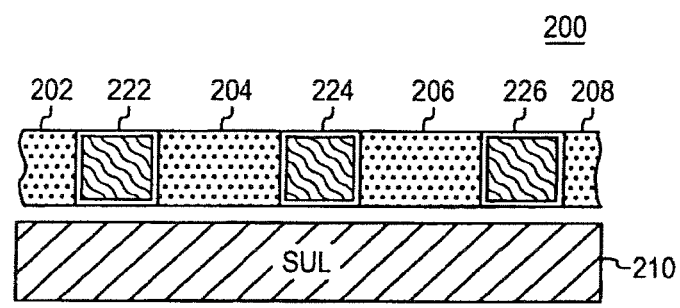
FIG. 2 is a schematic illustration showing media with ferromagnetic islands between tracks in accordance with an illustrative embodiment of the present invention.

FIG. 2 illustrates the disk media 200, which is a discrete track recording media suitable for perpendicular magnetic recording. The discrete tracks 202, 204, 206 and 208 are located above the soft underlayer 210. In accordance with the invention, soft magnetic regions, such as ferromagnetic islands 222, 224 and 226 are located between the tracks as shown in FIG. 2. The ferromagnetic islands are comprised of, illustratively, a soft magnetic material which will be described further herein.

Figure 3A:
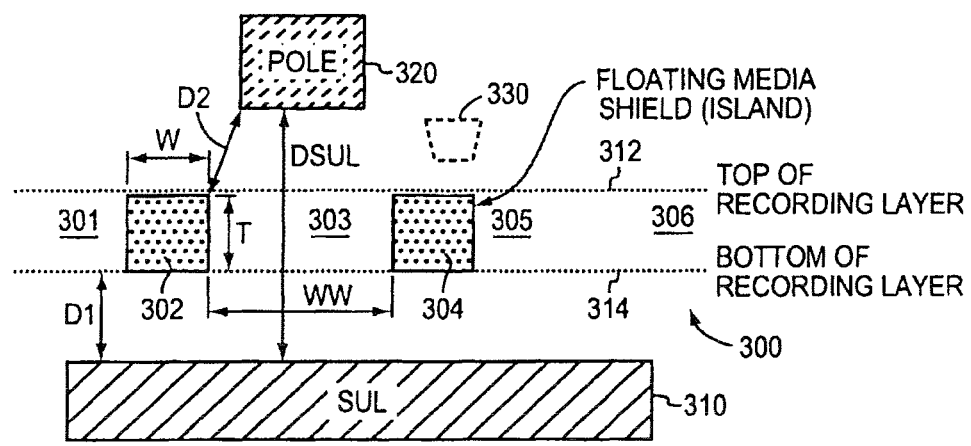
FIG. 3A is a schematic illustration of the magnetic write pole and its location with respect to the tracks and islands of the present invention.

FIG. 3A depicts one embodiment of the invention and illustrates several geometric parameters of the design. For example, the disk media 300 has discrete recording tracks 301, 303 and 305, which make up a recording layer 306. This recording layer is located above the soft underlayer 310. The top surface of the recording layer is identified by reference character 312 and the bottom surface of the recording layer is identified by reference character 314. A magnetic write pole 320 is writes data onto the media 300. In accordance with the invention, a ferromagnetic island 304, for example, can be flush with or slightly recessed from the top of the recording layer 312. The bottom of the ferromagnetic island 304, for example, in accordance with the invention, is relocated generally at the bottom of the recording layer, as illustrated by 314.

The width of the ferromagnetic islands (W) is preferably a fraction of the track pitch (TP), and TP is defined as WW+W (with reference to the illustration of FIG. 3A). Illustratively, in accordance with one aspect of the invention, W>10% TP and W<45% TP Furthermore, when the write pole 320 is on track, the distance from the pole head to the island 302 is defined as D2. D1 is the distance from the bottom of the island 302, for example, to the top of the soft underlayer 310, and DSUL is the distance from the pole head to the top of the soft underlayer 310. For given TP, it is preferred in accordance with the invention to maximize D1 plus D2 while keeping the area W times T (track height) large enough to avoid full saturation. In accordance with a further aspect of the invention, the islands can have a trapezoidal cross sectional shape, as illustrated in phantom by the item 330. The saturation magnetization of the island should be selected to avoid early saturation in accordance with the invention.

Figure 3B:
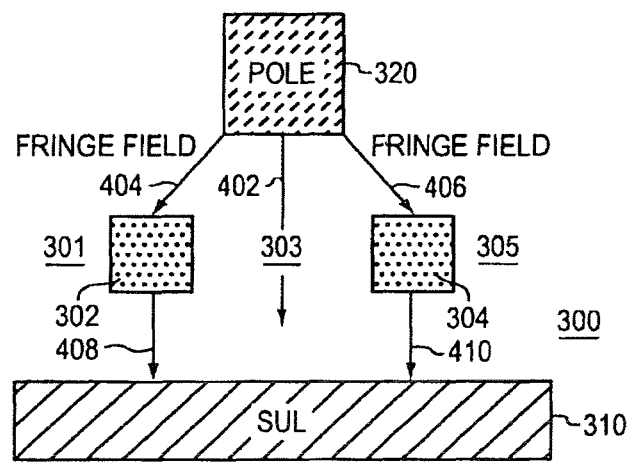
FIG. 3B is the media of FIG. 3A showing the magnetic flux lines with respect to the components.

FIG. 3B illustrates the magnetic flux lines for the disk media 300 when flux is emanating from write pole 320. The magnetic flux from the write pole 320 which is writing on the track 303 is illustrated by the arrow 402. In addition to the write field 402, the write pole 320 also generates fringe fields 404 and 406. In accordance with the invention, the fringe fields 404 and 406 are absorbed by the islands 302 and 304 of the present invention. The paths 408 and 410 show that the flux is conducted directly to the soft underlayer 310 during a write operation.

Figure 4:
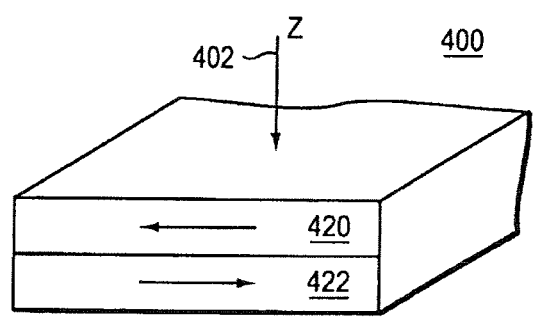
FIG. 4 is a side elevation of the ferromagnetic island of the present invention illustrating the rest state magnetization coupling within the layers of the island.

FIG. 4 illustrates a ferromagnetic island 400 in accordance with the present invention. As just discussed with reference to FIG. 3B, the magnetic flux 402 travels from the write pole 320 to the disk in, for example, a "Z" direction as shown in FIG. 4. The ferromagnetic islands of the present invention thus provide a path to magnetic ground (in the SUL). In order to encourage the flux to travel in the Z direction, the ferromagnetic coupling of the ferromagnetic island 400 should be such as that shown in FIG. 4. As illustrated, the rest state magnetization in the upper layer 420 is oriented in a first direction, and the rest state magnetization in the lower layer 422 is radiating in an opposite direction. This allows good upstream and downstream conduction of the flux so that the ferromagnetic island can be placed directly next to the adjacent track without the risk that the island may generate its own fringe field that travels, undesirably, into the adjacent track. Thus, it is designed to have the magnetic coupling illustrated in FIG. 4 in order to provide these advantages.

Figure 5A:
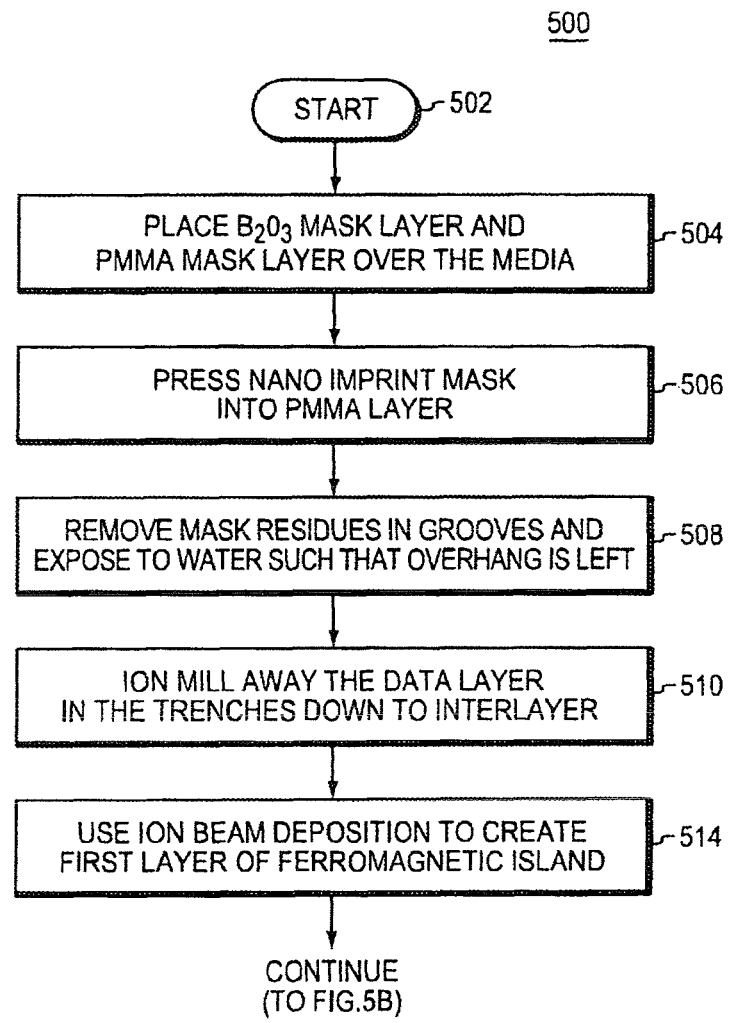
FIGS. 5A and 5B illustrate a flow chart of a procedure in accordance with a method of manufacturing the media in accordance with the present invention.

The method of manufacturing a DTR media with the ferromagnetic island shown in FIG. 4, in accordance with the invention, is described with reference to the flow chart of FIG. 5 and with further reference to FIGS. 6 through 10.

Referring to FIG. 5, the procedure 500 begins at step 502 and continues to step 504 in which a $B_2O_3$ mask layer and a PMMA mask layer are placed over a set of layers for a perpendicular recording medium. More specifically, as shown in FIG. 6, the media 600 includes a soft underlayer 602, which is comprised of a bottom layer 604, a ruthenium intermediate layer 606, and a top SUL layer 608. The SUL is biased in such a manner that the rest state magnetization in the bottom layer 604 is in a direction opposite to that of the top layer 608. Above the SUL is an interlayer of ruthenium or ruthenium chromium 610. The magnetic data layer 612 is comprised primarily of magnetic material. Above the magnetic data layer is a carbon overcoat layer 613. In accordance with the invention, a two layer mask is provided over the carbon overcoat layer 613. The two layer mask 614 is comprised of a top layer of a soft organic material such as polymethyl methacrylate (PMMA) that is illustratively cured at elevated temperatures to improve its resistance to solvents. A harder bottom layer is disposed adjacent to the PMMA layer. This harder bottom layer is, illustratively, substantially comprised of $B_2O_3$. However, it should be understood by those skilled in the art that other hard layers could be utilized while remaining within the scope of the present invention. The $B_2O_3$ mask layer is illustrated in FIG. 6 as layer 616 and the PMMA mask layer is illustrated in FIG. 6 as the layer 618.

Figure 6:
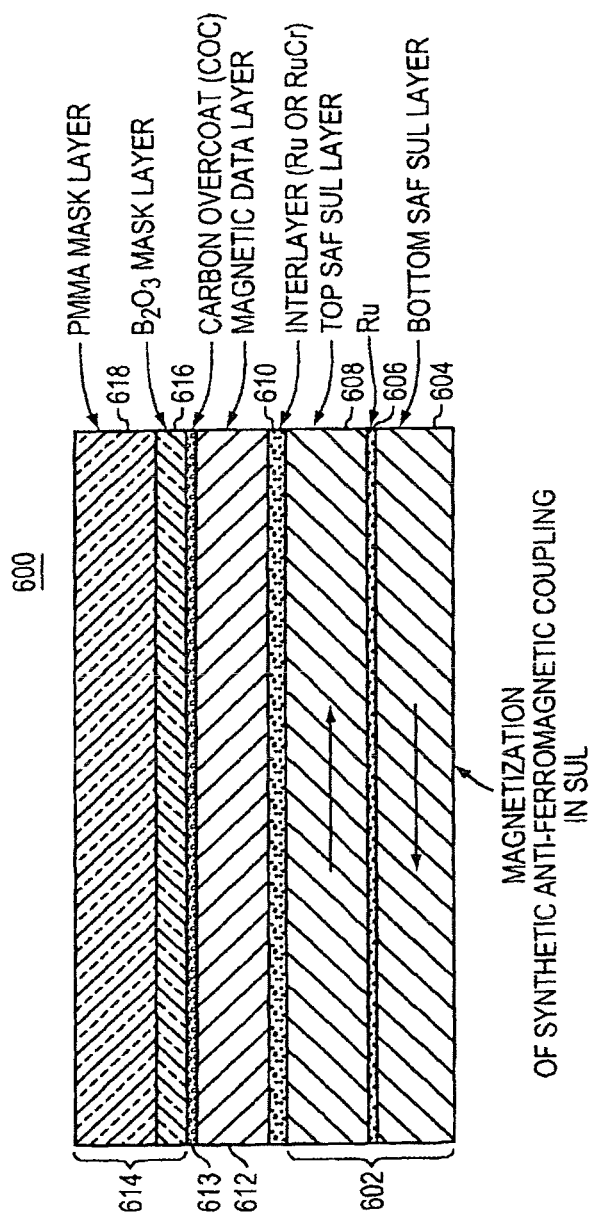
FIG. 6 is a schematic illustration of the pre-manufacture layering, which results in improved media of the present invention.
Figure 7:
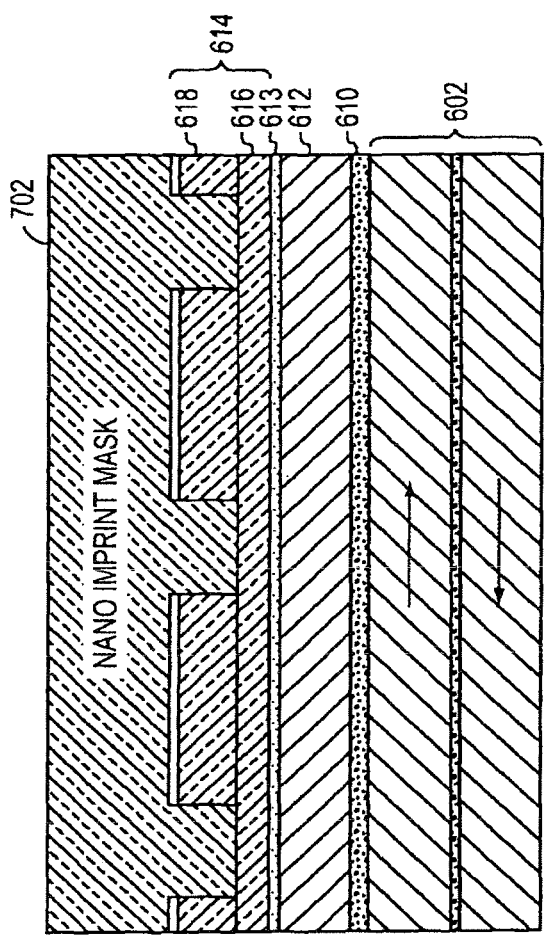
FIG. 7 illustrates the patterning after the application of the nano-imprint mask used in the second step of the method of manufacture of the present invention.

After the initial structure is layered in a manner as such shown in FIG. 6, the procedure 500 continues to step 506 in which a nano imprint mask is pressed into the PMMA layer 618. This step is illustrated in FIG. 7, which is a portion of the media of FIG. 6, and depicts the SUL 602, the intermediate layer 610, the magnetic data layer 612 and the carbon overcoat layer 613, the $B_2O_3$ layer 616 and the PMMA layer 618.

A nano-imprint mask 702 is pressed down into the PMMA layer 618. Illustratively, the nano imprint mask in pressed into the layer 618 of PMMA, but not far into the harder $B_2O_3$ layer 616. This squeezes portions of the PMMA layer to form trenches with almost no PMMA layer therebetween.

Figure 8:
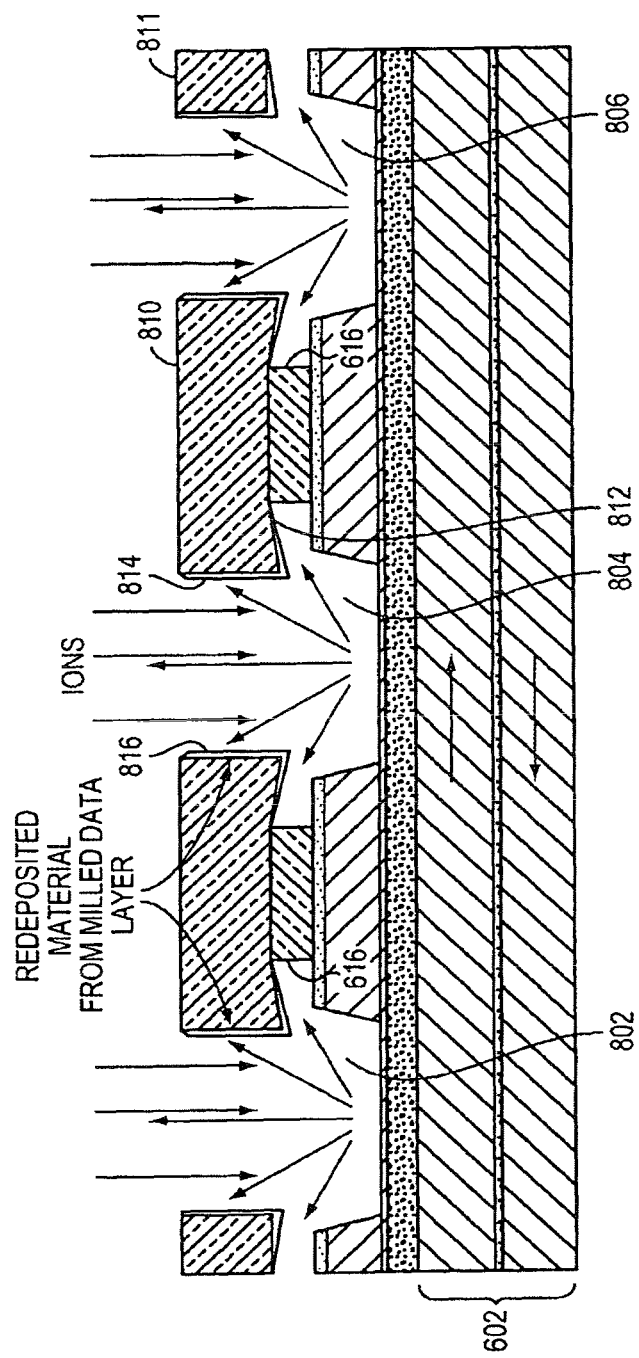
FIG. 8 is a schematic illustration of the ion milling step after undercutting the PMMA mask by dissolving part of a $B_2O_3$ layer.
Figure 9:
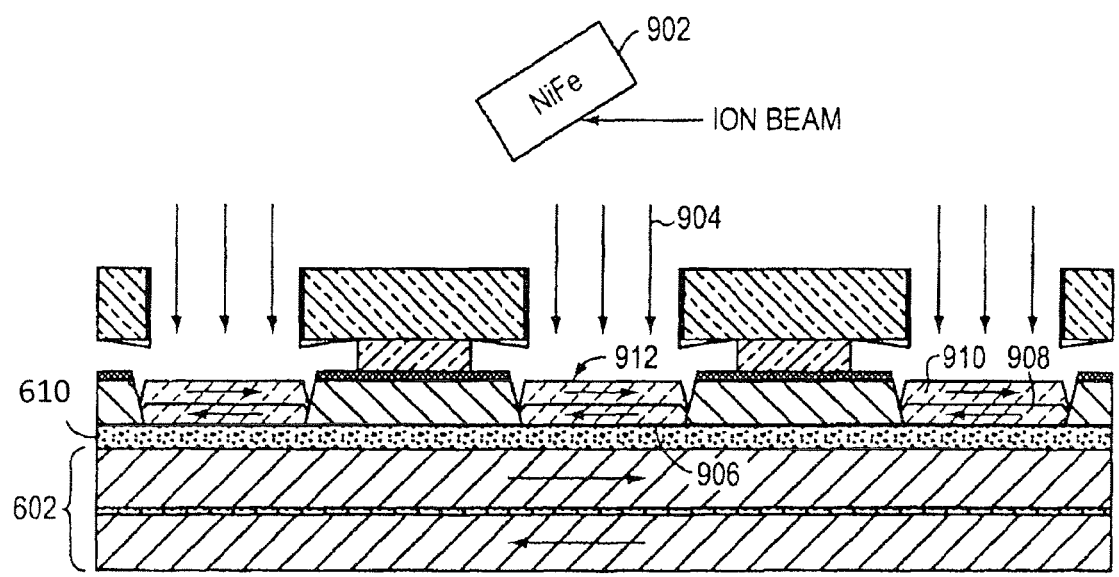
FIG. 9 is an illustration of the deposition of the soft magnetic material forming a layer of the island in accordance with the present invention.

After the trenches are formed, the nano-imprint mask 702 is removed in accordance with step 508 and the trenches are first exposed to a mild ion mill step to remove PMMA residues from the trenches and are then exposed water to partially dissolve the $B_2O_3$ layer 616. This may be better understood with reference to FIG. 8. In FIG. 8, the nano imprint mask has been removed and the PMMA has been squeezed to leave trenches such as the trenches 802, 804 and 806. The PMMA layer is now formed of separate structures, such as structures 810, 811. When the $B_2O_3$ layer 616 is exposed to water, it is done in such a manner that some of it partly dissolves but not all of it so that an overhang, such as the overhang 812 on the structure 810, is left. The overhang 812 is intentionally left on each of the PMMA structures so that the milled data layer material will not redeposit in a way that bridges the overhang.

The procedure then continues to step 510 in which ion milling is used to remove the data layer to create a cavity that reaches down to the interlayer which, as noted, is between the data layer and the SUL. The depth of this ion milling step can be regulated using end point detection of the RU atoms (e.g. mass spectrometry). Notably, as the data layer is ion milled from the trench, some material from the milled data layer is re-deposited such as that illustrated by 814 and 816 onto the overhang 812 on each PMMA structure.

In accordance with step 514, an ion beam deposition (IBD) process is used to create the first layer of the ferromagnetic island in accordance with the present invention. More specifically, referring to FIG. 9, an ion beam deposition is performed at normal incidence from a soft ferromagnetic target, which may be CoFe, NiFe, CoTaZr or CoNiFe. Illustratively, a nickel iron alloy is used in the example of FIG. 9. More specifically, a NiFe target 902 is bombarded with ions, resulting in ion beam deposition 904 of the first layer 906 of the ferromagnetic island 912. The thickness of this layer is illustratively approximately half that of the magnetically hard data layer 614. In the flow chart of FIGS. 5A and 5B, this is step 514, in which ion beam deposition is used to create the first layer of the ferromagnetic material in the trench.

Next, in accordance with step 516, the intermediate layer of the island is ion beam deposited. This intermediate layer 908 is an antiferromagnetic coupling layer. Antiferromagnetic layer 908 may consist of ruthenium, copper or chromium. If the layer 908 is substantially comprised of ruthenium, its thickness is, illustratively, about 7 angstroms. This achieves the desired anti ferromagnetic behavior.

In accordance with step 518, the final layer of the island is a ferromagnetic layer 910, which is deposited from the same target as the first or from a third target with the same or different alloy. For the second layer 910, its magnetization times its thickness product should be approximately equal to that of the first layer 906, so that most of the remnant flux can circulate between the two layers, as noted hereinbefore. This avoids demagnetization fields within the ferromagnetic island itself, which could undesirably travel into an adjacent layer.

Notably, the soft antiferromagnetic coupling nature of the island of the present invention is similar to the magnetic coupling of the SUL 602 that exists within the media. Referring again to the ferromagnetic island 912, the total thicknesses of the three deposited layers should not exceed the depth of the circumferential cavities that were previously milled into the disk. In other words, the trench should be substantially filled with the layered materials, but not to a level higher than the data layer on the discrete track. This is to maintain a consistent flyable height, thereby avoiding peaks and valleys being created on the surface of the media.

Figure 5B:
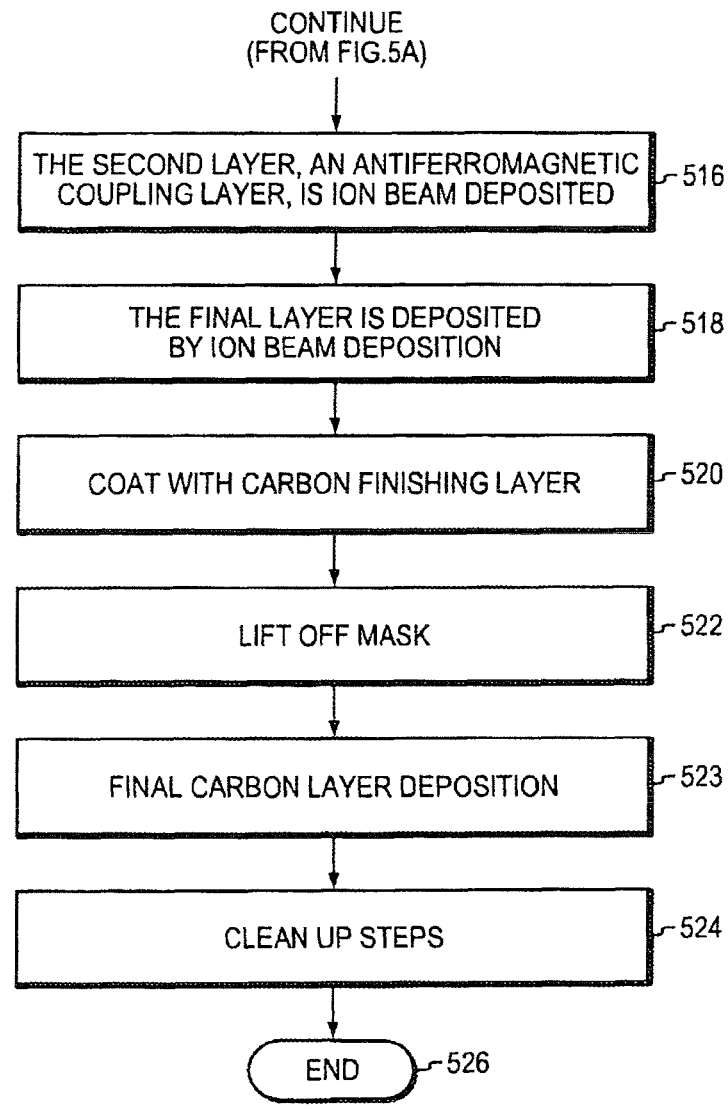
Figure 10:
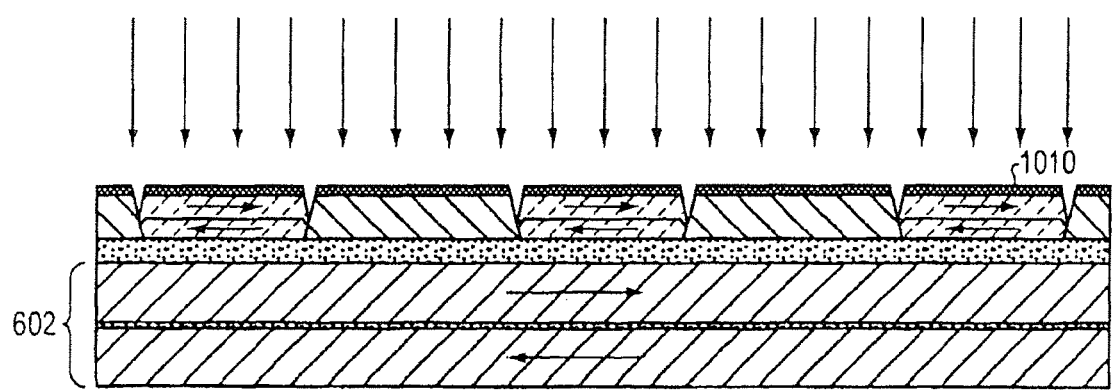
FIG. 10 illustrates the deposition of the final carbon overcoat after mask lift-off, and cleaning steps.

A carbon overcoat layer is then placed on the final product, as shown in FIG. 5B in step 520. Thereafter, in step 522, the mask is lifted off, and a solvent is used to remove the remaining $B_2O_3$ layer 616. When the mask is lifted off, more specifically, the mask will be stripped from the disk using exposure to a suitable sequence of solvents, such as acetone, to strip the PMMA and alcohol to strip the remaining $B_2O_3$. Application of a high pressure blast of solid carbon particles will aid in the removal of any adhered particles. Referring to FIG. 10, a final carbon layer 1010 is deposited to improve corrosion resistance and mechanical durability by covering areas where the carbon deposition was too thin at the edge of the mask openings. This is step 523 in FIG. 5B. After this, the disk will go through a standard burnish and test processing as will be understood by those skilled in the art as a clean up step 524. The top layer of the media can be fully or partially laminated, if desired, in a particular application of the invention. The procedure ends at step 526.

It should be understood that the present invention provides an improved media design and a method of manufacturing such a media that reduces the effects of write fringing. The ferromagnetic island is disposed between tracks in a discrete track recording media. This design has the advantage that the island reduces the loss of flux out of the write head field, but yet reduces the risk of adjacent track data erasure. This is accomplished without requiring additional components to be added to the write head.

What is claimed is:

1. An apparatus, comprising:
   a soft underlayer; and
   a data layer above the soft underlayer, the data layer comprising:
      a data storing portion; and
      a non-data storing portion including a plurality of ferromagnetic features comprising two layers of a ferromagnetic material separated by an anti-ferromagnetic coupling layer and configured to conduct fringe field flux towards the soft underlayer.

2. The apparatus of claim 1, wherein the anti-ferromagnetic coupling layer comprises a layer of ruthenium.

3. The apparatus of claim 1, wherein:
   the data layer defines a plurality of tracks; and
   the thickness of a first ferromagnetic layer of the two layers of the ferromagnetic material is less than or equal to about one half the thickness of the tracks.

4. The apparatus of claim 1, wherein:
   the data layer defines a plurality of tracks; and
   the width of each ferromagnetic feature is between 10 percent and 45 percent of the track pitch, where track pitch defines a distance from a first leading edge of one track to a second leading edge of an adjacent track.

5. The apparatus of claim 1, wherein each ferromagnetic feature has a trapezoidal-shaped cross section.

6. The apparatus of claim 1, wherein:
   the data layer defines a plurality of tracks; and
   a height of the plurality of ferromagnetic features is equal to or less than a height of the tracks.

7. The apparatus of claim 1, wherein the data layer defines a plurality of tracks, and the apparatus further comprises:
   a first carbon overcoat over the tracks; and
   a second carbon overcoat over the plurality of ferromagnetic features.

8. The apparatus of claim 1, wherein the soft underlayer comprises a top soft under layer having a first magnetization direction and a bottom soft underlayer having a second magnetization direction that is different than the first magnetization direction.

9. The apparatus of claim 8, wherein the soft underlayer comprises a ruthenium layer between the top soft under layer and the bottom soft underlayer.

10. The apparatus of claim 1, further comprising:
an interlayer situated above the soft underlayer and beneath the plurality of ferromagnetic features and the data layer.

11. An apparatus, comprising:
a data layer; and
a soft underlayer beneath the data layer, wherein the data layer comprises:
a data storing portion; and
a non-data storing portion comprising a plurality of ferromagnetic features configured to conduct fringe field flux towards the soft underlayer, the ferromagnetic features comprising a first layer having a first magnetization direction and a second layer having a second magnetization direction that is different from the first magnetization direction.

12. The apparatus of claim 11, wherein each of the ferromagnetic features comprises a ferromagnetic material separated by a layer of ruthenium.

13. The apparatus of claim 11, wherein:
the data layer defines a plurality of tracks;
each of the ferromagnetic features comprises a first layer of ferromagnetic material and a second layer of ferromagnetic material separated by a layer of ruthenium; and
a thickness of the first ferromagnetic material layer is less than or equal to about one half the thickness of the tracks.

14. The apparatus of claim 11, wherein:
the data layer defines a plurality of tracks;
a width of the ferromagnetic features is between about 10 percent and about 45 percent of a track pitch; and
the track pitch is defined by a distance from a first leading edge of one of the tracks to a second leading edge of an adjacent one of the tracks.

15. The apparatus of claim 11, wherein each ferromagnetic feature has a generally trapezoidal-shaped cross section.

16. The apparatus of claim 11, wherein:
the data layer defines a plurality of tracks; and
a height of the ferromagnetic features is equal to or less than a height of the tracks.

17. The apparatus of claim 11, wherein the data layer defines a plurality of tracks, and the apparatus further comprises:
a first carbon overcoat over the tracks; and
a second carbon overcoat over each ferromagnetic feature.

18. The apparatus of claim 11, wherein the soft underlayer comprises:
a top soft underlayer having a first magnetization direction; and
a bottom soft underlayer having a second magnetization direction that is different from the first magnetization direction.

19. The apparatus of claim 18, wherein the soft underlayer further comprises a ruthenium layer between the top soft underlayer and the bottom soft underlayer.

20. The apparatus of claim 11, further comprising an interlayer disposed above the soft underlayer and beneath the plurality of ferromagnetic features.

* * * * *